March 26, 1968   L. L. ANDERSON, JR., ET AL   3,374,815
WOODCUTTING SAW BLADE
Filed Aug. 30, 1965                                    2 Sheets-Sheet 1
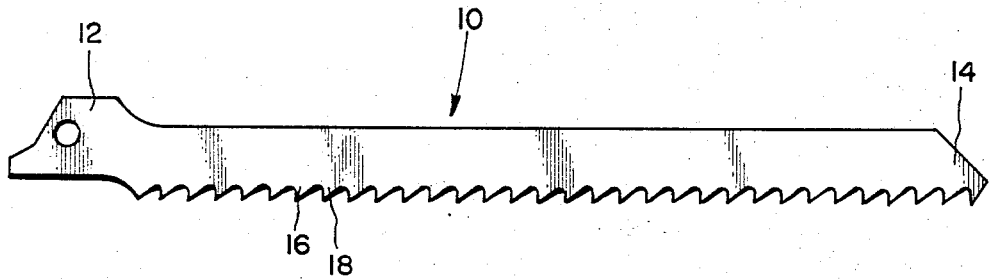
FIG. 1
FIG. 2
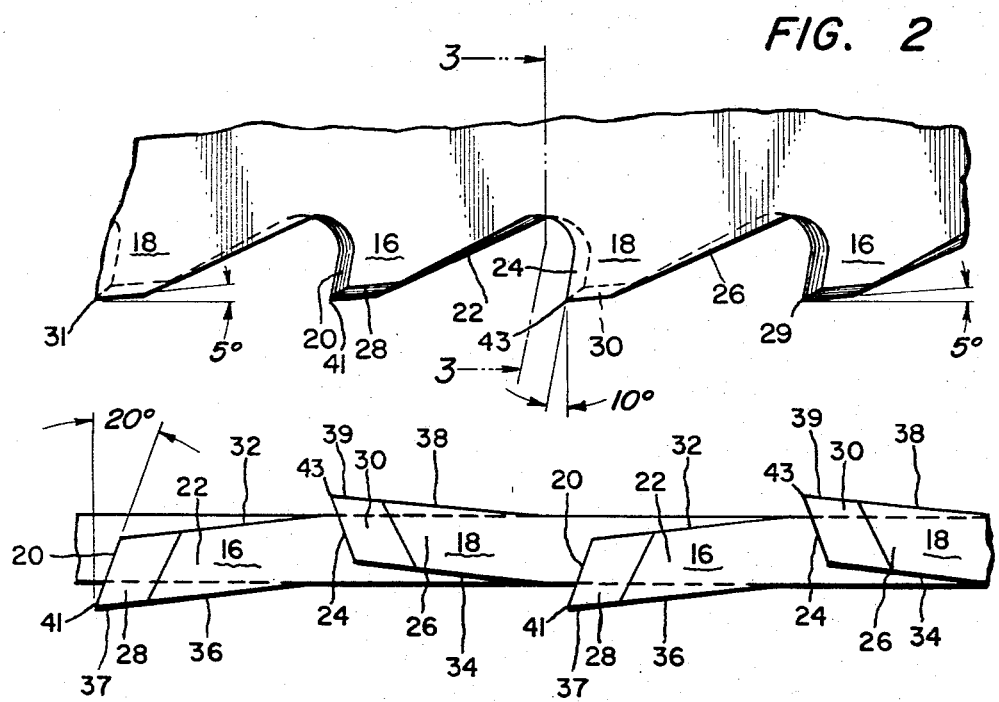
FIG. 4
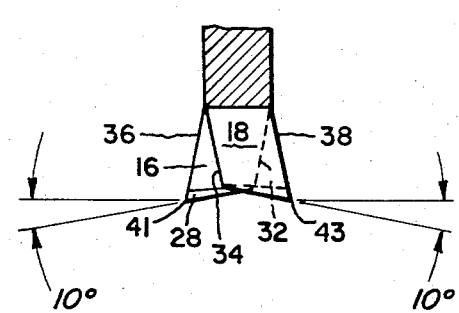
FIG. 3
INVENTORS
LEROY L. ANDERSON, JR.
FREDERICK DRUGAN March 26, 1968   L. L. ANDERSON, JR., ET AL   3,374,815
WOODCUTTING SAW BLADE Filed Aug. 30, 1965   2 Sheets-Sheet 2

INVENTORS
LEROY L. ANDERSON, JR.
FREDERICK DRUGAN

United States Patent Office 3,374,815
Patented Mar. 26, 1968

3,374,815
WOODCUTTING SAW BLADE
Leroy L. Anderson, Jr., and Frederick Drugan, Greenfield, Mass., assignors to Millers Falls Company, Greenfield, Mass., a corporation of Massachusetts
Filed Aug. 30, 1965, Ser. No. 483,680
2 Claims. (Cl. 143—133)

ABSTRACT OF THE DISCLOSURE

A reciprocating saw blade particularly adapted for woodcutting, comprising a plurality of cutting teeth which each include a generally transversely extending, chiseling edge and a scoring point such that, during the use of the saw blade, each of these cutting teeth both chisel and score the wood being cut.

The disclosure

This invention relates to saws and has more particular reference to the provision of a new and improved saw blade which is particularly adapted for woodcutting with a reciprocating saw.

Conventionally, saw blades for woodcutting with circular and hand operated reciprocating saws are generally constructed for cutting in only one specific wood grain direction. Blades for cutting across the wood grain (i.e. crosscut saw blades) are provided with pointed cutting teeth adapted to score the wood, while blades for cutting in the direction of the wood grain (i.e. rip saw blades) are provided with flattened teeth adapted to chisel the wood. The tooth geometry of these single purpose blades, furthermore, usually does not include sufficient tooth clearance for the blades to be successfully employed with a reciprocating power saw due to the relatively short stroke and light feed pressure characteristics of such power saws.

As a result, saw blades for woodcutting with reciprocating power saws, such as reciprocating portable electric saws, are usually limited to two basic forms. That is, they either include crosscut teeth with set or, alternatively, teeth which are cut at alternating angles and relieved by taper grinding or setting. The former of these blades, although generally fast cutting and relatively inexpensive to manufacture, is undesirable in that it produces a rough cut and requires relatively high feed pressure. This form of blade, furthermore, does not operate satisfactorily in cutting wood of a thickness greater than twice the stroke of the power saw. The latter of these blades does generally cut smoothly, but is undesirable in that it cuts extremely slowly except when the wood is of a thickness less than one-half of the stroke of the power saw.

An object of the present invention is to provide a new and improved saw blade particularly adapted for woodcutting with a reciprocating power saw, which saw blade is constructed and arranged to speedily and smoothly cut the wood in either grain direction regardless of the thickness of the wood and the length of the stroke of the power saw.

Another object of the invention is to provide a new and improved saw blade of the type set forth which is constructed and arranged such that each cutting tooth scores and chisels the wood being cut to reduce feed pressure requirements to a minimum and insure good woodcutting in either grain direction.

Another object is to provide a new and improved saw blade of the type set forth which is highly efficient in operation and relatively simple and economical in construction.

Other objects and advantages of the invention will be apparent from the following description taken in connection with the accompanying drawings. It will be understood that changes may be made in the details of construction and arrangement of parts shown and described as the preferred forms of the invention have been given by way of illustration only. It will also be understood that, although the specific tooth angles given in the illustrated embodiments of the invention have been found to be highly efficient in cutting many types of wood, they have been given herein for the purposes of illustration only. The particular tooth angles to be employed for any embodiment of the invention are influenced by such variables as the hardness of the wood to be cut, the amount of pitch or sap therein, and the openness of the grain thereof and are not necessarily limited or restricted to the angles herein specified.

Referring to the drawings:

FIG. 1 is a view in elevation of a saw blade constructed in accordance with the present invention;

FIG. 2 is an enlarged, fragmentary elevational view of the saw blade shown in FIG. 1;

FIG. 3 is a sectional view of the saw blade taken on line 3—3 of FIG. 2, looking in the direction of the arrows;

FIG. 4 is an enlarged, fragmentary longitudinal view of the saw blade shown in FIGS. 1 through 3;

Figure 5:
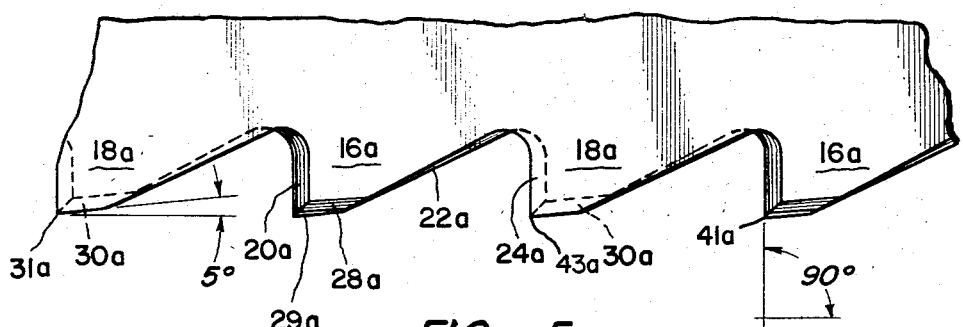
FIG. 5 is an enlarged, fragmentary elevational view of an alternative embodiment of the saw blade provided by the present invention, wherein parts similar to those shown in FIGS. 1 through 4 are designated by the reference character for their similar part followed by an *a*.
Figure 6:
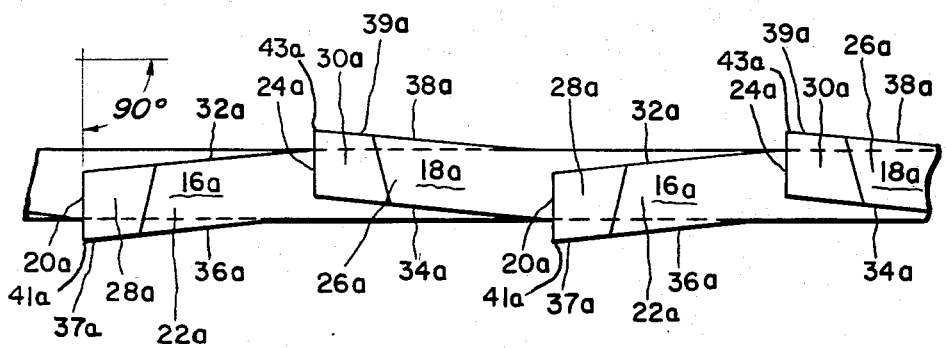
FIG. 6 is a fragmentary longitudinal view of the saw blade shown in FIG. 5.

Referring more particularly to the drawings wherein similar reference characters designate coresponding parts throughout the several views, FIG. 1 illustrates a saw blade designated generally at 10 which is constructed in accordance with the present invention. The saw blade 10 includes an end or shank portion 12 adapted for connection to a reciprocating portable electric saw or similar reciprocating power saw (not shown) and is tapered at its opposing end 14 towards a plurality of cutting teeth formed along one of its longitudinal edges.

FIGS. 2 through 4 are enlarged, fragmentary views illustrating the details of construction of the cutting teeth on the saw blade 10. As alternative ones of the cutting teeth are formed of substantially identical construction, only the two adjacent cutting teeth 16 and 18 will be specifically described. It will be understod, however, that this description of the cutting teeth 16 and 18 is equally applicable to alternative ones of the cutting teeth throughout the length of the saw blade 10.

More specifically, as illustrated in FIGS. 2 through 4, the cutting teeth 16 are formed with equal oblique face angles towards one side of the longitudinal axis of the saw blade 10. The cutting teeth 18, similarly, are formed with equal oblique face angles towards the opposing side of the longitudinal axis of the saw blade 10 such that adjacent cutting teeth 16 and 18 upon the saw blade 10 include equal oblique face angles towards the opposing sides of the longitudinal axis thereof. As a result of this construction, it will be seen that the leading and trailing surfaces 20 and 22, respectively, of each of the cutting teeth 16 are located out of longitudinal alignment with the trailing and leading surfaces 26 and 24, respectively, of the adjacent cutting teeth 18. Each of the leading and trailing surfaces 20 and 22 of one of the cutting teeth 16 is, however, parallel to and in longitudinal alignment with the leading and trailing surfaces 20 and 22, respectively, of the others of the cutting teeth 16; and the leading and trailing surfaces 24 and 26 of the cutting teeth 18 are in similar parallel and longitudinal alignment.

Alternatively to the foregoing, however, the saw blade 10 may be suitably taper relieved in the conventional manner. Each of the cutting teeth 16 is formed to include a leading surface 20 and a trailing surface 22 which are longitudinally joined by a chamfered or ground, nonarcuate intermediate or crest surface 28. The intermediate surfaces 28 each form a chiseling edge 29 with the leading surface 20 of their respective cutting teeth 16. The intermediate surfaces 28 are each longitudinally and transversely inclined relative to the leading and trailing surfaces 20 and 22, respectively, of their respective cutting teeth 16 and provide simultaneous side and back clearance for the cutting teeth 16. More specifically, each of the illustrated intermediate surfaces 28 includes substantially 5° of back clearance or backslope downwardly from its leading surface 20 to its trailing surface 22 and, also, substantially 10° of side clearance or side slope upwardly from the longitudinal axis of the saw blade 10. This back and side clearance could, however, be of other suitable magnitude up to a maximum of substantially 25°. Due to this double inclination of the intermediate surfaces 28, each intermediate surface 28 joins the outer face 36 of its respective cutting tooth 16 at an inclined edge 37 which meets the chiseling edge 29 at a sharp point 41 adapted to score the wood being cut by the saw blade 10 and, also, facilitates the action of the chiseling edge 29 of its leading surface 20 in chiseling the wood.

As illustrated in FIGS. 2 through 4, the cutting teeth 16 are each formed with substantially 10° of front rake angle and substantially 20° of side rake angle, with the intermediate surfaces 28 longitudinally shortening as they extend transversely from the inner faces 32 of the cutting teeth 16 to the outer faces 36 thereof. It will be understood, however, that the side rake angle and the front rake angle of the cutting teeth 16 may alternatively be substantially 0° as shown in FIG. 5 or any other suitable angles.

The cutting teeth 18 are each formed to include a leading surface 24 and a trailing surface 26 which are longitudinally joined by a chamfered or ground, nonarcuate intermediate or crest surface 30. The intermediate surfaces 30 each form a chiseling edge 31 with the leading surface 24 of their respective cutting teeth 18. The intermediate surfaces 30 are each longitudinally and transversely inclined relative to the leading and trailing surfaces 24 and 26, respectively, of their respective cutting teeth 18 and provide simultaneous side and back clearance for the cutting teeth 18. More specifically, similar to the intermediate surfaces 28 upon the cutting teeth 16, each of the illustrated intermediate surfaces 30 includes substantially 5° of back clearance or backslope downwardly from its leading surface 24 to its trailing surface 26 and, also, substantially 10° of side clearance or side slope upwardly from the longitudinal axis of the saw blade 10. The back and side clearances could, however, be of other suitable magnitude up to a maximum of substantially 25°. This double inclination of the intermediate surfaces 30 provides the cutting teeth 18 with inclined edges 39, adjacent the junctures of the intermediate surfaces 30 and the tooth outer faces 38, which meet the chiseling edges 31 at scoring points 43 and, also, facilitates the action of the chiseling edges 31 in chiseling the wood.

As illustrated in FIGS. 2 through 4, the cutting teeth 18 are provided with substantially 20° of side rake angle and substantially 10° of front rake angle, with the intermediate surfaces 30 each longitudinally shortening as they extend transversely from the inner faces 34 of the cutting teeth 18 to the outer faces 38 thereof. It will be understood, however, that the side rake angle and the front rake angle of the cutting teeth 18, similar to that of the cutting teeth 16, may alternatively be substantially 0° as illustrated in FIG. 5 or any other suitable angles.

The beforedescribed construction of the cutting teeth 16 and 18 has been found to provide such with a chiseling action and a simultaneous ripping or scoring action adjacent the outer faces 36 and 38 of the cutting teeth 16 and 18, respectively. This simultaneous chiseling and scoring action of each tooth of the saw blade 10 has been found to minimize feed pressure requirements and provide a smoother cut in either direction of wood grain than is conventionally possible even with a ground saw blade.

The operation of the invention is believed to be apparent from the foregoing description.

From the foregoing, it will be seen that the saw blade 10 which is provided by the present invention comprises a plurality of cutting teeth 16 and 18 which are each formed to simultaneously both score and chisel. This simultaneous scoring and chiseling of the wood by each of the cutting teeth 16 and 18 reduces feed pressure requirements to a minimal value while greatly facilitating the cutting of the wood in either direction of the grain. The free-cutting nature of the saw blade 10 insures that it provides a good and smooth cut regardless of the thickness of the wood and the length of the stroke of the reciprocating power saw. This construction of the saw blade 10, furthermore, as will be seen, is relatively simple and economical in production in spite of the high degree of cutting efficiency obtained through its beforedescribed construction.

From the foregoing, it will be seen that we have provided new and improved means for accomplishing all of the objects and advantages of our invention.

Having thus described our invention, we claim:

1. A reciprocating saw blade having a plurality of cutting teeth each comprising:
   a leading surface;
   a trailing surface;
   a flat intermediate surface longitudinally connecting said leading and trailing surfaces forming a generally transversely extending chiseling edge with said leading surface and longitudinally inclined from said leading surface to said trailing surface;
   inner and outer side faces bounded by said leading, trailing, and intermediate surfaces;
   said intermediate surface being transversely inclined to said outer side face and forming therewith an acute edge which joins said chiseling edge at a scoring point, and said leading surface and said outer side face forming an acute angle adjacent said scoring point;
   said longitudinal and transverse inclinations of said intermediate surface each being less than 25 degrees;
   the outer side faces of adjacent cutting teeth being on opposing sides of the saw blade whereby adjacent cutting teeth include said scoring point adjacent opposing sides; and
   the scoring point of each cutting tooth being laterally offset further than the inner side faces of the adjacent cutting teeth whereby said scoring point and chiseling edge form the only cutting portions of said cutting teeth.

2. A reciprocating saw blade according to claim 1, further comprising:
   adjacent ones of said cutting teeth being formed at oblique face angles towards opposing sides of the longitudinal axis of the saw blade.

References Cited

UNITED STATES PATENTS

| | | | |
|---|---|---|---|
| 2,763,298 | 9/1956 | Tomkies | 143—133 |
| 2,849,037 | 8/1958 | Wright | 143—133 |
| 2,936,801 | 5/1960 | Wilson | 143—140 |
| 3,109,464 | 11/1963 | La Force | 143—133 |

DONALD R. SCHRAN, *Primary Examiner.*